United States Patent
Lee

(10) Patent No.: US 10,542,218 B2
(45) Date of Patent: Jan. 21, 2020

(54) IMAGE PHOTOGRAPHING APPARATUS AND PHOTOGRAPHING METHOD THEREOF

(71) Applicant: Samsung Electronics Co., Ltd., Suwon-si (KR)

(72) Inventor: Tae-hee Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 399 days.

(21) Appl. No.: 15/072,184

(22) Filed: Mar. 16, 2016

(65) Prior Publication Data
US 2016/0277686 A1    Sep. 22, 2016

(30) Foreign Application Priority Data
Mar. 17, 2015  (KR) .................. 10-2015-0036826

(51) Int. Cl.
*H04N 7/00* (2011.01)
*H04N 5/232* (2006.01)

(52) U.S. Cl.
CPC ................. *H04N 5/23296* (2013.01)

(58) Field of Classification Search
CPC ............. H04N 5/2258; H04N 5/23296; H04N 13/239; H04N 13/296; H04N 2013/0081
See application file for complete search history.

(56) References Cited

U.S. PATENT DOCUMENTS

| | | | |
|---|---|---|---|
| 5,291,232 A * | 3/1994 | Kobayashi ............. | G02B 7/102 396/87 |
| 5,907,434 A | 5/1999 | Sekine et al. | |
| 6,809,771 B1 | 10/2004 | Hamaguchi et al. | |
| 8,605,970 B2 | 12/2013 | Bar-Aviv et al. | |
| 2010/0097444 A1* | 4/2010 | Lablans ................. | G03B 35/00 348/46 |
| 2015/0124125 A1* | 5/2015 | Kim ..................... | H04N 5/2628 348/239 |
| 2015/0249807 A1* | 9/2015 | Naylor ................... | H04N 7/18 348/155 |
| 2015/0334356 A1* | 11/2015 | Kim .................. | H04N 5/23219 348/143 |

* cited by examiner

*Primary Examiner* — Jessica M Prince
(74) *Attorney, Agent, or Firm* — Jefferson IP Law, LLP

(57) ABSTRACT

An image photographing apparatus and a photographing method thereof are provided. The image photographing apparatus includes two rotatable cameras spaced apart from each other in the same direction, and a controller configured to calculate a distance between the image photographing apparatus and an object, and to control at least one of the two rotatable cameras to rotate according to a viewing angle corresponding to the calculated distance.

14 Claims, 15 Drawing Sheets

IMAGE PHOTOGRAPHING APPARATUS AND PHOTOGRAPHING METHOD THEREOF

RELATED APPLICATION(S)

This application claims priority from Korean Patent Application No. 10-2015-0036826, filed on Mar. 17, 2015, in the Korean Intellectual Property Office, the disclosure of which is incorporated herein by reference in its entirety.

BACKGROUND

Apparatuses and methods consistent with the present disclosure relate to an image photographing apparatus and a photographing method thereof, and more particularly, to an image photographing apparatus and a photographing method thereof, for easily controlling a viewing angle of a camera.

Recently, electronic devices including a camera have become popular. Accordingly, a relatively small size electronic device such as a smart phone generally also includes a camera.

When a user wants to acquire or capture an image including an object such as people and surrounding environments of the object, a camera with a wide viewing angle is required. However, when an electronic device includes a camera, the camera may be generally small and may acquire only an image with a limited viewing angle.

In addition, when a special lens such as a fisheye lens is used to widen a viewing angle, a distorted lens may be acquired, and thus a different image from user's intention may be acquired.

Accordingly, there is a need for a method for acquiring an image with a viewing angle changed according to user's intention or convenience without distortion of a captured image by an image photographing apparatus with various types and sizes.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides an image photographing apparatus and a photographing method thereof, for changing a viewing angle of a camera in order to acquire an optimum image according to a distance between an image photographing apparatus and a user and a location of the user.

According to an aspect of the present disclosure, an image photographing apparatus includes two rotatable cameras spaced apart from each other in a same direction, and a controller configured to calculate a distance between the image photographing apparatus and an object, and to control at least one of the two rotatable cameras to rotate according to a viewing angle corresponding to the calculated distance.

The controller may determine a location of the object through an image captured by the two rotatable cameras, and control at least one of the two rotatable cameras to rotate according to the viewing angle corresponding to the calculated distance and the determined location.

The controller may control at least one of the two rotatable cameras to rotate so as to position the object in a middle of the captured image.

The controller may control at least one of the two rotatable cameras, which corresponds to a direction corresponding to the location of the object, to widen the viewing angle when the object is positioned adjacent the middle of the captured image.

The controller may control at least one of the two rotatable cameras to rotate so as to widen the viewing angle of a captured image as the distance between the image photographing apparatus and the object is increased.

The controller may determine whether the object is contained in an image captured by the two rotatable cameras, and control at least one of the two rotatable cameras to rotate so as to contain the object in the image captured when the object is not contained in the image captured.

The image photographing apparatus may further include a storage unit configured to match and store the distance between the image photographing apparatus and the object with the viewing angle corresponding to the distance, wherein, in response to the distance between the image photographing apparatus and the object being calculated, the controller searches for a pre-stored viewing angle corresponding to the calculated distance, stored in the storage unit, and controls at least one of the two rotatable cameras to rotate according to the searched pre-stored viewing angle.

Upon determining that the object moves, the controller may control at least one of the two rotatable cameras to rotate so as to position the object in a middle of a captured image according to the distance between the image photographing apparatus and the object and a movement direction of the object.

The image photographing apparatus may further include an output unit configured to output various alarms, wherein, upon calculating the distance between the image photographing apparatus and the object, upon calculating the distance between the image photographing apparatus and the object, determining that the object is more than a minimum distance away from the image photographing apparatus, the controller controlling the output unit to output warning alarm.

According to another aspect of the present disclosure, a photographing method of an image photographing apparatus includes calculating a distance between the image photographing apparatus and an object, controlling at least one of the two rotatable cameras spaced apart from each other in a same direction to rotate according to a viewing angle corresponding to the calculated distance. The method also includes capturing an image using the two cameras The photographing method may further include determining location of the object through the image captured by the two rotatable cameras, wherein the controlling comprises rotating at least one of the two rotatable cameras according to the viewing angle corresponding to the calculated distance and the determined location.

The controlling may include rotating at least one of the two rotatable cameras to position the object in a middle of the captured image.

The controlling may include controlling at least one of the two rotatable cameras, which corresponds to a direction corresponding to the location of the object, to widen the viewing angle when the object is positioned adjacent the middle of the captured image.

The controlling may include controlling a camera of the two cameras, which corresponds to a direction corresponding to the location of the object, to widen or reduce its viewing angle when the object is positioned on the right or left from the middle of the captured image.

The controlling may include controlling at least one of the two rotatable cameras to rotate so as to widen the viewing angle of a captured image as the distance between the image photographing apparatus and the object is increased.

The controlling may include determining whether the object is contained in the image captured by the two rotatable cameras, and controlling at least one of the two rotatable cameras to rotate so as to contain the object in the captured image when the object is not contained in the captured image.

The photographing method may further include matching and storing in a storage unit the distance between the image photographing apparatus and the object with the viewing angle corresponding to the distance, wherein the controlling may comprise, in response to the distance between the image photographing apparatus and the object being calculated, searching for a pre-stored viewing angle corresponding to the calculated distance, stored in the storage unit, and controlling at least one of the two rotatable cameras to rotate according to the searched pre-stored viewing angle.

The photographing method may further include determining whether the object moves, wherein the controlling comprises controlling at least one of the two rotatable cameras to rotate so as to position the object in a middle of the captured image according to the distance between the image photographing apparatus and the object and a movement direction of the object.

The photographing method may further include, upon calculating the distance between the image photographing apparatus and the object and determining that the object is not away from the image photographing apparatus by a minimum distance or more, outputting warning alarm.

According to various embodiments of the present disclosure, a viewing angle of a camera may be easily changed according to a distance between an image photographing apparatus and a user and a location of the user so as to acquire an optimum image.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other aspects of the present disclosure will be more apparent by describing certain exemplary embodiments of the present disclosure with reference to the accompanying drawings, in which.

DETAILED DESCRIPTION

Figure 1A:
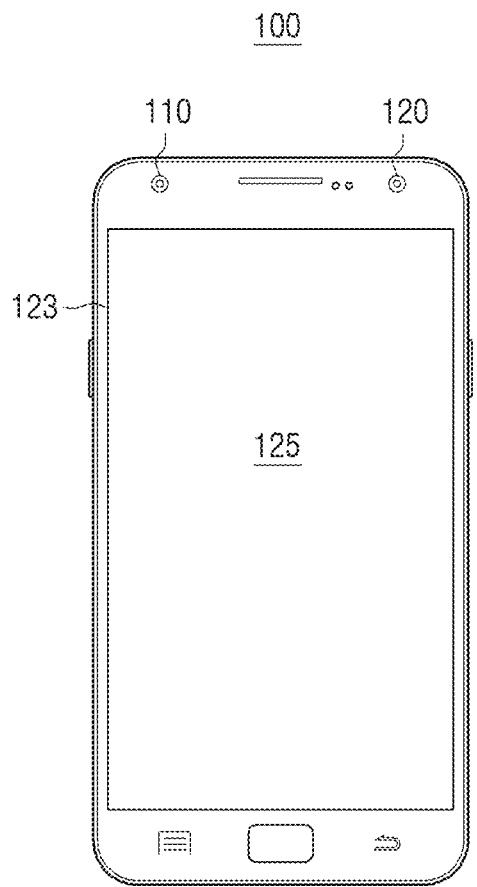
FIG. 1A is a diagram illustrating an image photographing apparatus according to an exemplary embodiment of the present disclosure.

As the disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, certain detailed explanations of related art are omitted when it is deemed that they may unnecessarily obscure the essence of the disclosure.

The terms such as "first" and "second" are used herein merely to describe a variety of constituent elements, but the constituent elements are not limited by the terms. The terms are used only for the purpose of distinguishing one constituent element from another constituent element.

The terms used in the present specification are used for explaining a specific exemplary embodiment, not limiting the present inventive concept. Thus, the expression of singularity in the present specification includes the expression of plurality unless clearly specified otherwise in context. Also, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

In the present specification, the terms, such as 'unit' or 'module', etc., should be understood as a unit that processes at least one function or operation and that may be embodied in a hardware manner, a software manner, or a combination of the hardware manner and the software manner. In addition, a plurality of 'modules' or a plurality of 'units' may be integrated to at least one module to embody at least one processor (not shown) except for a 'module' or a 'unit' which is required to be embodied as specific hardware.

FIG. 1A is a diagram illustrating an image photographing apparatus 100 according to an exemplary embodiment of the present disclosure. Although FIG. 1A illustrates the case in which the image photographing apparatus 100 is a smart phone, this is purely exemplary, and thus the image photographing apparatus 100 may be included in various electronic devices such as a cellular phone, a television (TV), a personal digital assistant (PDA), a notebook personal computer (PC), a tablet PC, a smart watch, and so on as well as a camera for capturing various images.

The image photographing apparatus 100 may include at least two cameras. That is, the image photographing apparatus 100 may include a first camera 110 and a second camera 120 that are spaced apart from each other and facing a same direction.

The first camera 110 and the second camera 120 may be embodied to be rotatable. That is, in order to widen or reduce a viewing angle of a captured image, the first camera 110 and the second camera 120 are rotatable. In some embodiments, a rotatable camera may include a zoomable lens. That is, a rotatable camera may be rotatable so as to zoom differently.

Figure 1B:
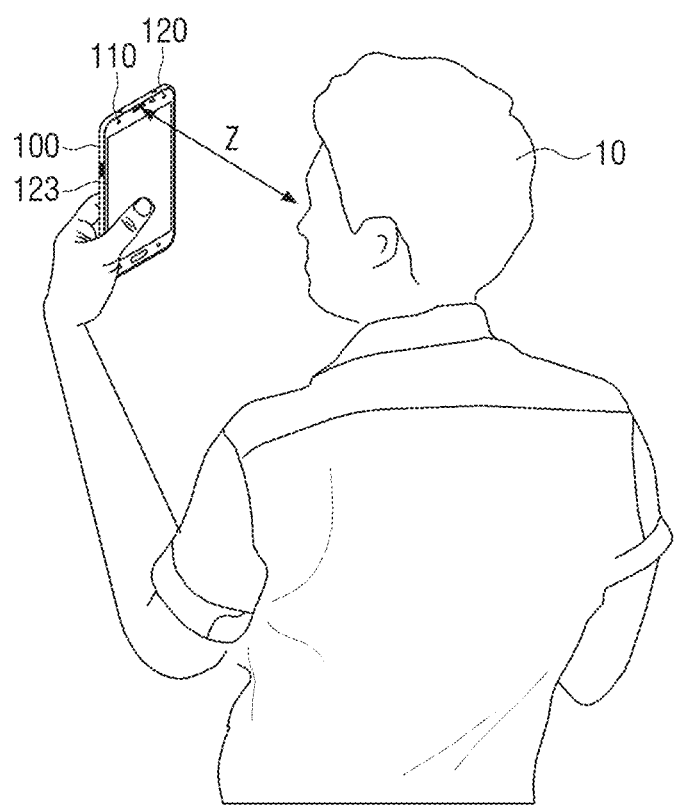
FIG. 1B is a diagram illustrating an image photographing apparatus and a user who uses the image photographing apparatus according to an exemplary embodiment of the present disclosure.

Accordingly, as illustrated in FIG. 1B, the image photographing apparatus 100 may calculate a distance Z between the image photographing apparatus 100 and a user 10 and control at least one of the first camera 110 and the second camera 120 to rotate according to a viewing angle corresponding to the calculated distance. In some embodiments, specifically, the distance Z is measured between a midpoint of the first camera 110 and the second camera 120, and the user 10.

That is, upon determining that the distance Z between the image photographing apparatus 100 and the user 10 corresponds to a range that requires a wider viewing angle than a basic viewing angle, the image photographing apparatus 100 may rotate at least one of the first camera 110 and the second camera 120 in an outer direction (with respect to a front surface 123) so as to widen a viewing angle.

The image photographing apparatus 100 may further include two or more cameras. As illustrated in FIG. 1A, the image photographing apparatus 100 embodied as a smart phone may include two or more cameras at the front surface 123 on which a display 125 is present.

In addition, the image photographing apparatus 100 may include two or more cameras at the front surface 123 on which the display 125 is present and also include two or more cameras at an opposite surface of the display 125.

As illustrated in FIGS. 1A and 1B, a user may acquire or capture an image with various ranges of viewing angles without distortion of the image using the image photographing apparatus 100.

Figure 2A:
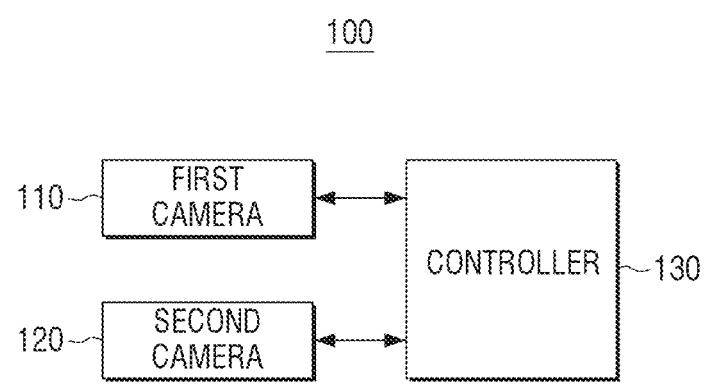
FIG. 2A is a block diagram illustrating a configuration of an image photographing apparatus according to an exemplary embodiment of the present disclosure.

Hereinafter, a configuration of the image photographing apparatus 100 will be described in detail with reference to FIG. 2A. As illustrated in FIG. 2A, the image photographing apparatus 100 may include the first camera 110, the second camera 120, and a controller 130.

The first camera 110 and the second camera 120 are components for capturing an image. In particular, the first camera 110 and the second camera 120 may be spaced apart and face the same direction, and may each be rotated. That is, the first camera 110 and the second camera 120 may rotate in a direction for widening a viewing angle of an image to be captured.

The controller 130 is a component for controlling an overall image photographing apparatus 100. That is, the controller 130 may calculate a distance between the image photographing apparatus 100 and an object. In addition, the controller 130 may control at least one of two cameras to rotate according to a viewing angle corresponding to the calculated distance.

In addition, the controller 130 may determine a location of an object through an image to be captured by the first camera 110 and the second camera 120 and control at least one of the first camera 110 and the second camera 120 to rotate according to a viewing angle corresponding to the determined location and the calculated distance.

In particular, the controller 130 may control at least one of the first camera 110 and the second camera 120 to rotate such that the object is positioned in a center or middle of the object.

That is, when the object is positioned adjacent or on the right or left from the middle of the captured image, the controller 130 may control a camera of the first camera 110 and the second camera 120, which corresponds to a direction corresponding to the location of the object, to widen or reduce the viewing angle, depending on how the at least one of the first camera 110 and the second camera 120 is rotated. For example, when the first camera 110 is rotated in a direction, the viewing angle is widened, and when the first camera 110 is rotated in an opposite direction, the viewing angle is reduced.

According to an exemplary embodiment of the present disclosure, the controller 130 may control at least one of the first camera 110 and the second camera 120 to rotate so as to widen a viewing angle of a captured image as a distance between the image photographing apparatus 100 and the object is increased.

According to another exemplary embodiment of the present disclosure, when the viewing angle of one of the first camera 110 and the second camera 120, which corresponds to a direction corresponding to the location of the object, is reduced, the controller 130 may enlarge an image captured using the first and second cameras 110 and 120 using a super resolution scheme to provide an effect of a telephoto lens.

The controller 130 may determine whether an object is contained in a captured image through the image captured by the first camera 110 and the second camera 120, and when the object is not contained in the captured image, the controller 130 may control at least one of the first camera 110 and the second camera 120 to rotate so as to search and contain the object in the captured image.

In addition, upon determining that the object moves, the controller 130 may control at least one of the first camera 110 and the second camera 120 to rotate so as to position the object in the middle of a captured image according to the distance between the image photographing apparatus 100 and the object and a moving direction of the object.

For example, in response to a user command for consecutive photographs being taken, the controller 130 may determine the distance between the image photographing apparatus 100 and the object, and the moving direction of the object during the consecutive photography. In addition, the controller 130 may control a camera to change a viewing angle according to the distance between the image photographing apparatus 100 and the object, and the moving direction of the object so as to position the object in the middle of the image to be captured. That is, the controller 130 may control at least one of the first camera 110 and the second camera 120 to rotate along with the movement of the object.

Figure 2B:
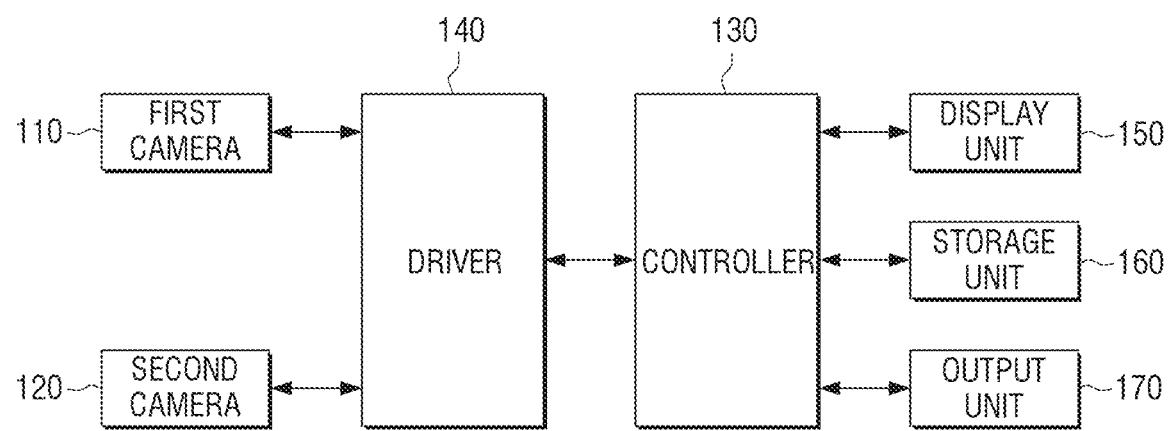
FIG. 2B is a block diagram illustrating a configuration of an image photographing apparatus according to an exemplary embodiment of the present disclosure.

As illustrated in FIG. 2B, the image photographing apparatus 100 may further include a driver 140, a display unit 150, a storage unit 160, and an output unit 170 as well as the first camera 110, the second camera 120, and the controller 130.

The driver 140 is a component that drives a camera to change its viewing angle. That is, the driver 140 may drive at least one of the first camera 110 and the second camera 120 to rotate according to control of the controller 130.

The display unit 150 is a component that displays an image. The display unit 150 may display a captured image or an image to be captured, as a live view. In addition, the display unit 150 may selectively display a portion of the captured image.

The storage unit 160 is a component that stores various program modules required by the image photographing apparatus 100 and/or other components.

In particular, the storage unit 160 may match the distance between the image photographing apparatus 100 and the object, with a viewing angle corresponding to the distance. When a match results, the storage unit 160 may also store the match result. For example, the storage unit 160 may match the distance between the distance between the image photographing apparatus 100 and the object, with a viewing angle appropriate for the distance and store the match result.

Accordingly, upon calculating the distance between the image photographing apparatus 100 and the object, the controller 130 may search for a viewing angle corresponding to the calculated distance from data pre-stored in the storage unit 160. In addition, the controller 130 may control at least one of the first camera 110 and the second camera 120 to rotate according to the retrieved viewing angle.

The output unit 170 is a component that outputs various alarms. In particular, upon determining that the object is more than a minimum distance away from the image photographing apparatus 100, the output unit 170 may output warning alarm, for example, to the object.

For example, the controller 130 may calculate a minimum photograph distance for photographing an object according to viewing angles of the first camera 110 and the second camera 120. That is, the minimum photograph distance may refer to a minimum distance between the image photographing apparatus 100 and the object, required to photograph the object. The minimum photograph distance may be changed according to the viewing angles of both the first camera 110 and the second camera 120. A method for calculating a minimum distance will be described below in detail.

Accordingly, when the controller 130 calculates the distance between the image photographing apparatus 100 and the object and determines that the object is more than a minimum distance from the image photographing apparatus 100, the output unit 170 may output warning alarm according to control of the controller 130.

For example, the output unit 170 may output warning alarm in the form of audio or video. However, the warning alarm is not limited to audio or video. In addition, the output unit 170 may include a light emitting diode (LED) and control the LED to emit light so as to visually output warning alarm.

Hereinafter, with reference to FIG. 3, a method for calculating a distance between the image photographing apparatus 100 and an object in order to determine a viewing angle appropriate to photograph an image will be described.

Each camera included in the image photographing apparatus 100 may include a component required to capture an image, such as an image sensor and a lens. Accordingly, as illustrated in FIG. 3, the first camera 110 may include a first lens 110-1 and a first image sensor 110-2 on which an image of an object 103 is formed. In addition, the second camera 120 may also include a second lens 120-1 and a second image sensor 120-2 on which an image of the object 103 is formed. Accordingly, f of FIG. 3 refers to a focal length.

In order to derive the distance Z between the image photographing apparatus 100 and the object 103, Equations (1) and (2) below may be generated using the focal length (f), a distance b between the first camera 110 and the second camera 120, a location $X_l$ at which an image of the object 103 is formed with respect to the first camera 110, a location $X_r$ at which an image of the object 103 is formed with respect to the second camera 120, and a distance X by which an object 103 is away from a central point of cameras.

$$\frac{X_l}{f} = \frac{X + \frac{b}{2}}{Z} \quad (1)$$

$$\frac{X_r}{f} = \frac{X - \frac{b}{2}}{Z} \quad (2)$$

In addition, Equation (3) below may be derived using Equations (1) and (2) above.

$$X_l - X_r = \frac{b \cdot f}{Z} \quad (3)$$

Accordingly, disparity on an image sensor may be represented according to Equation (4) below.

$$g(X_l - X_r) \propto \frac{b \cdot f}{Z} \quad (4)$$

That is, function g( ) of Equation (4) may be a monotonic function. When the distance Z between the image photographing apparatus 100 and the object 30 is derived using Equations (3) and (4), the controller 130 may determine a viewing angle appropriate for the calculated distance Z.

The information about the acquired or calculated distance Z may be converted into depth-map information using disparity between a plurality of cameras, and various depth-map refinement schemes may be additionally applied. For example, when a viewing angle wider than a basic viewing angle is required, the controller 130 may control at least one of the first camera 110 and the second camera 120 to rotate so as to widen its corresponding viewing angle, based on the depth-map information.

According to an exemplary embodiment of the present disclosure, the storage unit 160 may match the distance between the image photographing apparatus 100 and an object, with a viewing angle corresponding to the distance via the controller 130. When a match results, the storage unit 160 may store the match result in the storage unit 160. For example, the storage unit 160 may via the controller 130 match the distance Z between the image photographing apparatus 100 and the object 30, with a viewing angle appropriate for the distance Z. When a match results, the storage unit 160 may store the match result.

Accordingly, upon calculating the distance Z between the image photographing apparatus 100 and the object 30, the controller 130 may search for and retrieve a pre-stored viewing angle corresponding to the calculated distance from data stored in the storage unit 160. In addition, the controller 130 may control at least one of the first camera 110 and the second camera 120 to rotate according to the retrieved pre-stored viewing angle.

In addition, the image photographing apparatus 100 may determine a viewing angle corresponding to a distance between the image photographing apparatus 100 and an object according to user settings. The case in which a viewing angle of an image to be acquired using the first camera 110 and the second camera 120 is 70° will be exemplified.

The user may set the image photographing apparatus 100 to capture an image with a viewing angle of 80° when the distance between the image photographing apparatus 100 and the object is 1 meter (m). Accordingly, upon determining that the distance between the image photographing apparatus 100 and the object is 1 m via the aforementioned method, the controller 130 may control the first camera 110 and the second camera 120 to rotate at 5° in an outer direction.

The image photographing apparatus 100 may detect faces of people from objects and provide an image with a viewing angle appropriate to photograph a plurality of users together. In addition, the image photographing apparatus 100 may provide a new function of capturing a plurality of images to generate a video image with a changed viewing angle while a camera angle is changed for an adjustment of the viewing angle.

Figure 3:
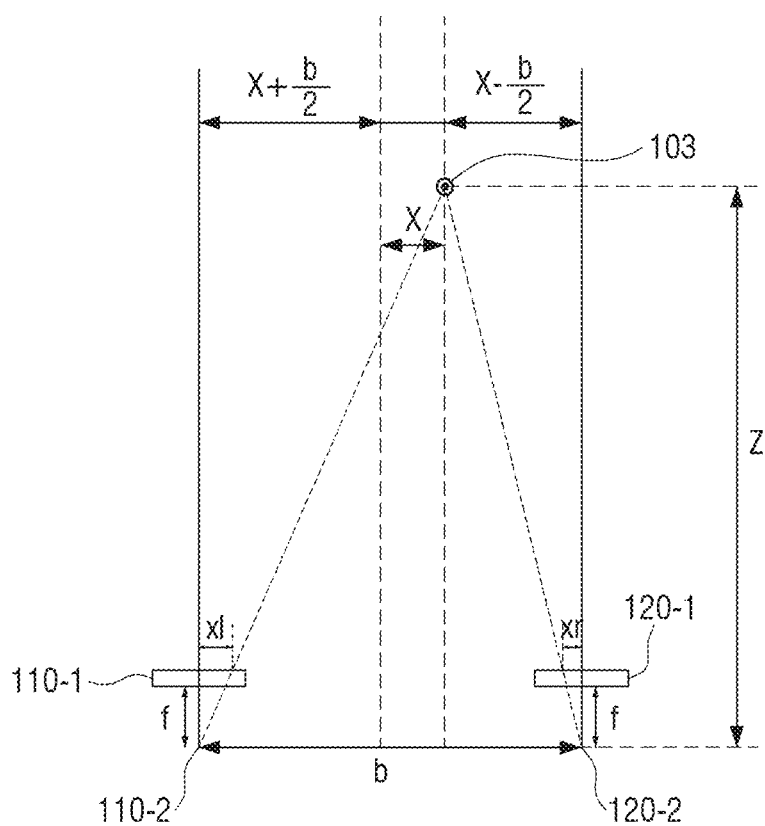
FIG. 3 is a diagram for explanation a method for calculating a distance between an image photographing apparatus and an object according to an exemplary embodiment of the present disclosure.

The method illustrated in FIG. 3 exemplarily calculates a distance between the image photographing apparatus 100 and an object, and thus the image photographing apparatus 100 may include a component such as a time of flight (TOF) sensor to calculate the distance between the image photographing apparatus 100 and the object.

The controller 130 may also acquire or capture the size of the object with respect to the captured image using a depth-map. A detailed embodiment of a depth-map will be described below.

Figure 4A:
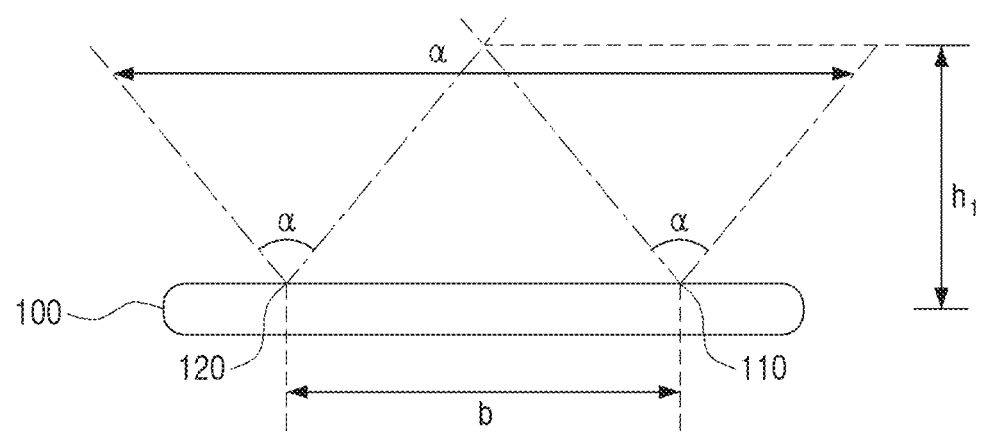
FIGS. 4A and 4B are diagrams for explanation of change in viewing angle and a minimum photograph distance according to an exemplary embodiment of the present disclosure.
Figure 4B:
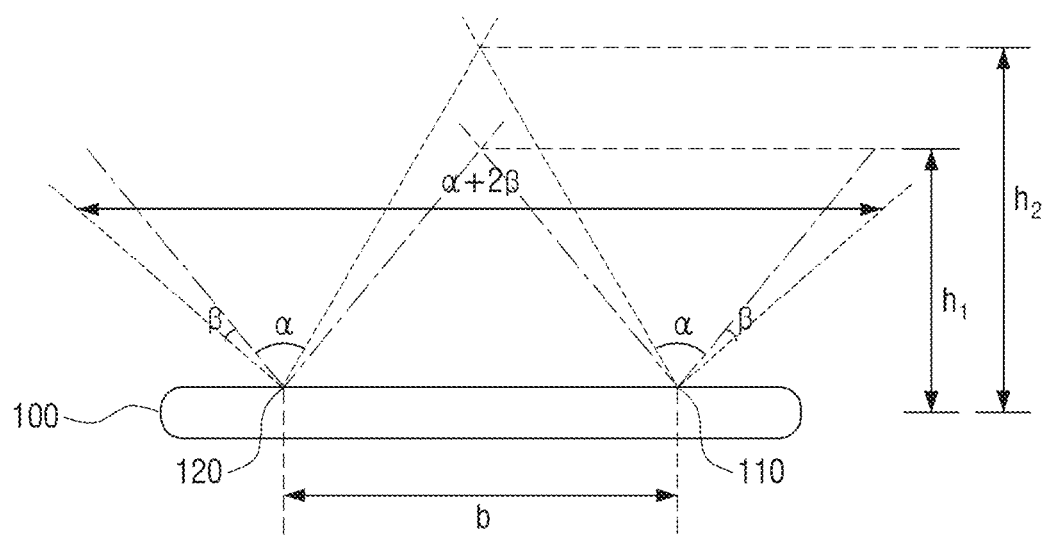

FIGS. 4A and 4B are diagrams for explanation of change in viewing angle and a minimum photograph distance according to an exemplary embodiment of the present disclosure.

As illustrated in FIG. 4A, when viewing angles of the first camera 110 and the second camera 120 are each α, even if there are a plurality of cameras, a viewing angle for photograph using all cameras may be α. In addition, a minimum photograph distance with respect to viewing angle α may be $h_1$.

As illustrated in FIG. 4B, when the first camera 110 and the second camera 120 rotate by β in an outer direction, the image photographing apparatus 100 may capture an image with a viewing angle of α+2β using a plurality of cameras. As a viewing angle is increased, a minimum photograph distance may also be increased to $h_2$ from $h_1$.

When the distance between the first camera 110 and the second camera 120 is b, a minimum photograph distance $h_2$ may be derived according to Equation 5 below.

$$h_2 = \frac{1}{2} \cdot \frac{b}{\tan\left(\frac{\alpha}{2} - \beta\right)} \quad (5)$$

Accordingly, the case in which the distance between the first camera 110 and the second camera 120 is 5 cm and viewing angles of the first camera 110 and the second camera 120 are each 70° will be exemplified below.

Since $h_1$ is a minimum photograph distance when β is 0°, when β=0 is inserted to Equation (5) above, $h_1$ is 3.57 cm. In addition, when β=5 is inserted to Equation (5) above, $h_2$ is 4.33 cm.

Accordingly, upon determining that an object is not away from an image photographing apparatus by a minimum photograph distance or more, the controller 130 may control the output unit 170 to output warning alarm to the object. For example, the controller 130 may control a light-emitting diode (LED) included in the output unit 170 to emit light while blinking.

FIGS. 5A through 5D are diagrams for explanation of an image photographing result according to an exemplary embodiment of the present disclosure.

Figure 5A:
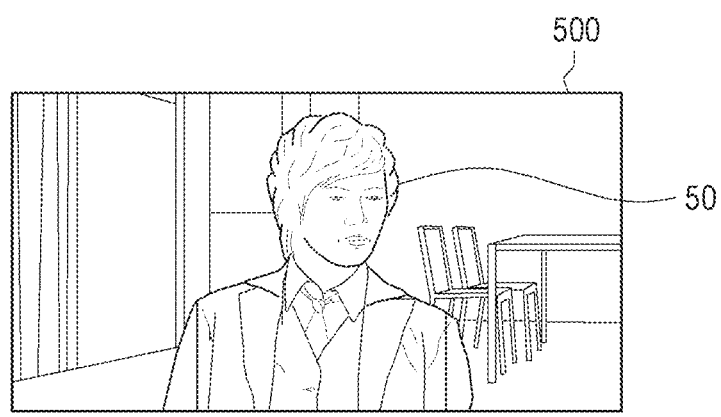
FIGS. 5A through 5D are diagrams for explanation of an image photographing result according to an exemplary embodiment of the present disclosure.

FIG. 5A is a diagram illustrating an image 500 acquired or captured using the first camera 110 and the second camera 120 according to an exemplary embodiment of the present disclosure. That is, the image 500 is captured with a person as an object 50.

The controller 130 may acquire a distance between the image photographing apparatus 100 and the object 50, and a relative size of the object 50 with respect to the captured image using a depth-map. Accordingly, the controller 130 may change a viewing angle of a camera in order to acquire a captured image in which the object 50 is positioned in a predetermined region.

Figure 5B:
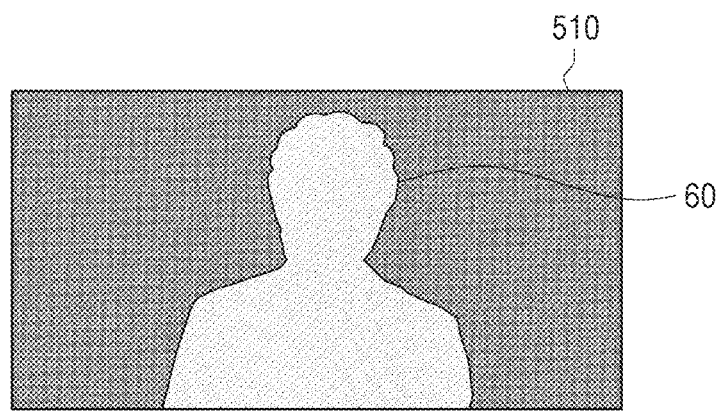

For example, as shown in FIG. 5B, if the object 50 does not move during image photograph, the controller 130 may change a viewing angle such that the object 50 occupies a center or a central portion of the captured image with a size corresponding to ⅔ of an entire image size. The controller 130 may control at least one of the first camera 110 and the second camera 120 to rotate for the changed viewing angle.

Figure 5C:
Figure 5D:

Accordingly, as illustrated in FIGS. 5C and 5D, if the object 50 is inclined in one direction in a captured image, an image illustrated in FIG. 5A may be acquired without movement of the object 50 or a user.

When images 520 and 530 illustrated in FIGS. 5C and 5D are captured, the controller 130 may determine that the object 50 is not contained in both of the images 520 and 530. Accordingly, the controller 130 may change a viewing angle to contain an entire portion of the object 50 in the captured image.

Figure 6A:
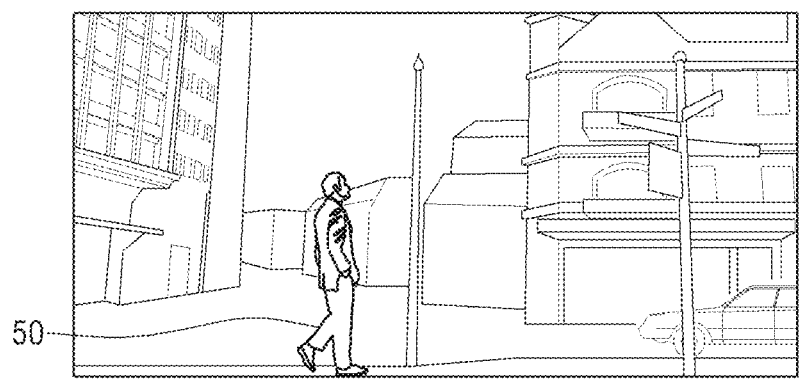
FIGS. 6A through 6C are diagrams for explanation of a method for capturing an image along with movement of an object according to an exemplary embodiment of the present disclosure.
Figure 6B:
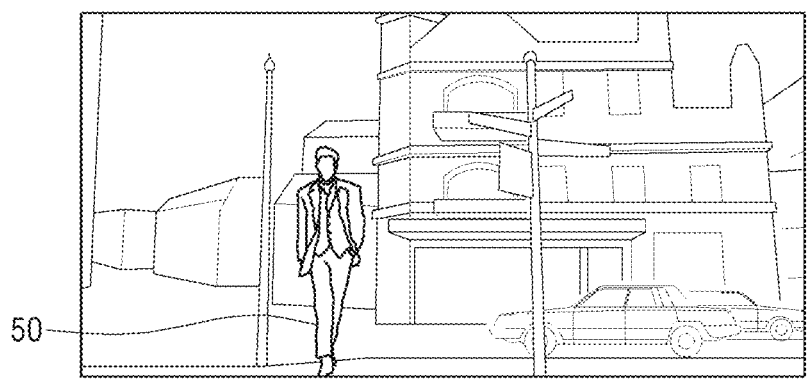
Figure 6C:
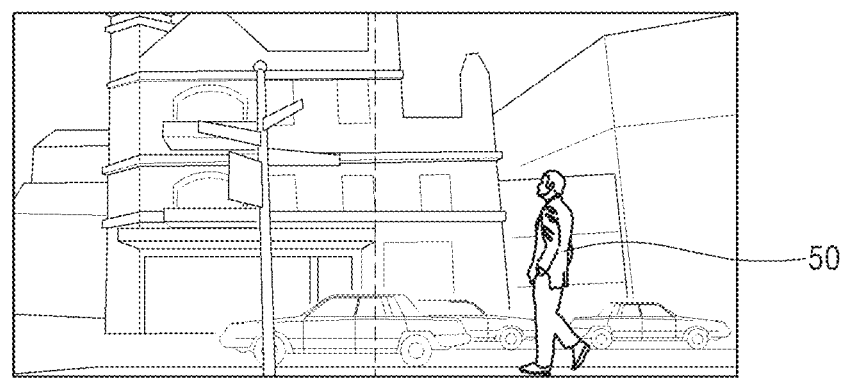

FIGS. 6A through 6C are diagrams for explanation of a method for capturing an image along with a moving object 50 according to an exemplary embodiment of the present disclosure. That is, the case in which images 600, 610, and 620 are consecutively captured with respect to the moving object 50 as illustrated in FIGS. 6A through 6C will be exemplified below.

The image photographing apparatus 100 may change a viewing angle such that the object 50 occupies a predetermined region of the captured image as described above while consecutive or sequential photography is performed along with a movement of the object 50.

In detail, the controller 130 may calculate a distance between the image photographing apparatus 100 and the object 50 via the aforementioned method. In addition, the controller 130 may generate a depth-map with respect to the object 50. Even if the object 50 moves, the controller 130 may change a viewing angle so as to position the object 50 in the middle of the captured images 600, 610, and 620, as illustrated in FIGS. 6A through 6C. That is, the controller 130 may control the first camera 110 and the second camera 120 to rotate according to the calculated viewing angle.

The case in which a viewing angle is changed to position the object 50 in the middle of a captured image is just an example, and thus the controller 130 may acquire a second captured image 610 and a third captured image 620 while changing the viewing angle to position the object 50 at a position for the object 50 in a first captured image 600.

Figure 7:
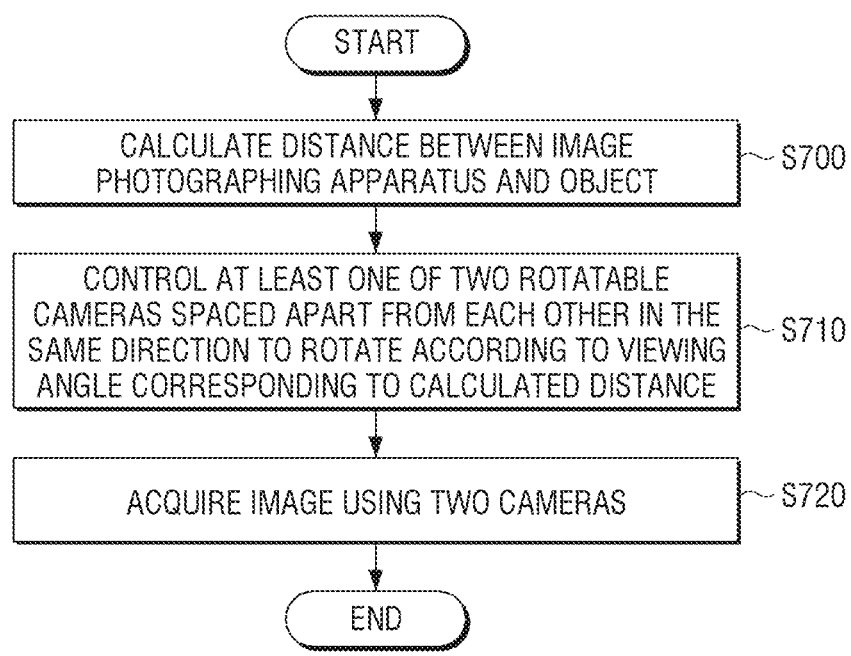
FIG. 7 is a diagram illustrating a photographing method of an image photographing apparatus according to an exemplary embodiment of the present disclosure.

FIG. 7 is a diagram illustrating a photographing method of an image photographing apparatus according to an exemplary embodiment of the present disclosure.

First, the image photographing apparatus 100 may calculate a distance between the image photographing apparatus 100 and an object (S700). The image photographing apparatus 100 may include at least two cameras disposed in the same direction. Accordingly, the image photographing apparatus 100 may calculate the distance between the image photographing apparatus 100 and the object using a plurality of cameras.

The image photographing apparatus 100 may control at least one of two rotatable cameras that are spaced apart from each other in the same direction to rotate according to a viewing angle corresponding to the calculated distance (S710).

The image photographing apparatus 100 may match a distance to an object with a viewing angle appropriate for the distance and store the result information. Accordingly, upon calculating the distance to the object, the image photographing apparatus 100 may determine a viewing angle corresponding to the calculated distance using pre-stored data. In addition, the image photographing apparatus 100 includes two rotatable cameras and thus may control at least one of a plurality of cameras to rotate according to the determined viewing angle.

In addition, the image photographing apparatus 100 may acquire an image using two cameras (S720).

Via the aforementioned method, a user may easily change a viewing angle of a camera according to a distance between an image photographing and an object so as to acquire an optimum image.

The aforementioned components of the image photographing apparatus 100 may be embodied in software. For example, the image photographing apparatus 100 may further include a flash memory or other non-volatile memories. A program corresponding to each component of the image photographing apparatus 100 may be stored in the non-volatile memory.

The controller 130 of the image photographing apparatus 100 may be embodied to include a central processing unit (CPU) and a random access memory (RAM). The CPU of the controller 130 may perform the aforementioned function of a user terminal by copying the aforementioned programs stored in the non-volatile memory and then executing the copied programs.

In general, a controller is a component being in charge of control of a device. The controller may have the same meaning as a central processing device, a microprocessor, a processor, and the like and may be interchangeably used. In addition, a controller of an image photographing apparatus may be embodied as a single chip system, such as, for example, System-on-a-chip (SOC) and System on chip (SoC), together with other functional units such as communication unit included in the image photographing apparatus.

The aforementioned photographing method of the image photographing apparatus according to various embodiments of the present disclosure may be coded in software and stored in a non-transitory readable medium. The non-transitory readable medium may be installed in various devices and used.

The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video discs (DVDs), hard disks, Blu-ray disks, universal serial buses (USBs), memory cards, and read-only memory (ROM).

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An image photographing apparatus comprising:
    a first rotatable camera and a second rotatable camera spaced apart from each other in a same direction;
    a storage storing information regarding a distance between the image photographing apparatus and an object, and a viewing angle which increases in proportion to the distance; and
    a controller configured to:
        identify an object, the object being included in both an image obtained by the first rotatable camera and an image obtained by the second rotatable camera,
        calculate the distance between the image photographing apparatus and the object,
        identify a location of the object through an image captured by the first and second rotatable cameras,
        based on the distance being calculated, search for a pre-stored viewing angle corresponding to the calculated distance based on the information, and
        control at least one of the first and second rotatable cameras to rotate according to the searched pre-stored viewing angle,
    where the controller, based on an object included in an image obtained by any one of the first and second rotatable cameras not being included in an image obtained by the other camera, rotates the other camera to photograph the object, and
    wherein the object included in the captured image is positioned in a predetermined position by rotating at least one of the first and second rotatable cameras.

2. The image photographing apparatus as claimed in claim 1, wherein the object is positioned in a middle of the captured image.

3. The image photographing apparatus as claimed in claim 2, wherein the controller controls at least one of the first and second rotatable cameras, which corresponds to a direction corresponding to the location of the object, to widen the viewing angle based on the object being positioned adjacent the middle of the captured image.

4. The image photographing apparatus as claimed in claim 1, wherein the controller controls at least one of the first and second rotatable cameras to rotate so as to widen the viewing angle of the image as the distance between the image photographing apparatus and the object is increased.

5. The image photographing apparatus as claimed in claim 1, wherein the controller identifies whether the object is contained in the captured image by the first and second rotatable cameras, and controls at least one of the first and second rotatable cameras to rotate so as to contain the object in the captured image based on the object being not contained in the captured image.

6. The image photographing apparatus as claimed in claim 1, wherein, upon the controller identifying that the object moves, the controller controls at least one of the first and second rotatable cameras to rotate so as to position the object in a middle of the image according to the distance between the image photographing apparatus and the object and a movement direction of the object.

7. The image photographing apparatus as claimed in claim 1, further comprising an output device configured to output various alarms,
    wherein, upon calculating the distance between the image photographing apparatus and the object, identifying that the object is more than a minimum distance away from the image photographing apparatus, the controller controlling the output unit device to output a warning alarm.

8. A photographing method for use with an image photographing apparatus having a first rotatable camera and a second rotatable camera and storing information regarding a distance between the image photographing apparatus and an object, and a viewing angle which increases in proportion to the distance, the method comprising:

identifying an object, the object being included in both an image obtained by the first rotatable camera and an image obtained by the second rotatable camera;

calculating the distance between the image photographing apparatus and the object;

identifying a location of the object through an image captured by the first and second rotatable cameras;

based on the distance being calculated, searching for a pre-stored viewing angle corresponding to the calculated distance based on the information;

controlling at least one of the first and second rotatable cameras spaced apart from each other in a same direction to rotate according to the searched pre-stored viewing angle; and capturing an image using the first and second rotatable cameras, wherein the controlling comprises, based on an object included in an image obtained by any one of the first and second rotatable cameras not being included in an image obtained by the other camera, rotating the other camera to photograph the object, and wherein the object included in the captured image is positioned in a predetermined position by rotating at least one of the first and second rotatable cameras.

9. The photographing method as claimed in claim 8, wherein the object is positioned in a middle of the captured image.

10. The photographing method as claimed in claim 9, wherein the controlling comprises controlling at least one of the first and second rotatable cameras, which corresponds to a direction corresponding to the location of the object, to widen the viewing angle based on the object being positioned adjacent the middle of the captured image.

11. The photographing method as claimed in claim 8, wherein the controlling comprises controlling at least one of the first and second rotatable cameras to rotate so as to widen the viewing angle of a captured image as the distance between the image photographing apparatus and the object is increased.

12. The photographing method as claimed in claim 8, wherein the controlling comprises identifying whether the object is contained in the image captured by the first and second rotatable cameras, and controlling at least one of the first and second rotatable cameras to rotate so as to contain the object in the captured image based on the object being not contained in the captured image.

13. The photographing method as claimed in claim 8, further comprising identifying whether the object moves, wherein the controlling comprises controlling at least one of the first and second rotatable cameras to rotate so as to position the object in a middle of the captured image according to the distance between the image photographing apparatus and the object and a movement direction of the object.

14. The photographing method as claimed in claim 8, further comprising, upon calculating the distance between the image photographing apparatus and the object and identifying that the object is not away from the image photographing apparatus by a minimum distance or more, outputting warning alarm.

* * * * *